United States Patent Office 2,897,179
Patented July 28, 1959

2,897,179

HARDENER FOR EPOXY RESIN COMPOSITION

Leon Shechter and John Wynstra, Union County, and Norman H. Reinking, Morris County, N.J., assignors to Union Carbide Corporation, a corporation of New York No Drawing. Application July 18, 1956
Serial No. 598,531

9 Claims. (Cl. 260—47)

This invention relates to new amine-epoxide compositions that are heat curable to valuable plastic products and which are useful in casting, potting and encapsulating preparations. More particularly, this invention is concerned with reacting and curing of glycidyl derivatives of arylamines and polyhydric phenols to resinous products with a particular class of alicyclic diamines whereby valuable results are achieved.

Prior to this invention, it was generally known that epoxy resin compositions, particularly those obtained by reacting polyhydric phenols or aromatic polyamines with chlorohydrins, could be cured by reacting with a wide variety of polyfunctional compounds to hard, insoluble, infusible resinous products having a variety of end uses. Among the varied uses that have become popularly associated with the employment of these resin compositions are their applications in surface coatings, glass fiber laminates, metal-to-metal adhesives, castings, and in potting and encapsulating of such things as electrical components. The curing of an epoxy resin involves an alteration in physical characteristics, caused by internal chemical changes, that are usually induced by heat or by crosslinking with compounds containing active hydrogen atoms. For example, a complex glycidyl ether of a polyhydric phenol such as diphenylolpropane, having an epoxy equivalency greater than 1, i.e. containing an average of more than one terminal, 1,2 epoxy group

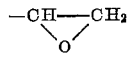

per molecule, can be cured by simply mixing with, and heating if necessary, such compounds as polybasic acids or their anhydrides, polyhydric alcohols, polyhydric phenols, polythiols or polyamines. Particularly valuable results are achieved when epoxy resins are cured with amines, especially amines containing active hydrogen atoms such as ethylene diamine because curing can be effected at room temperatures. Another attractive feature of amine cured epoxy resins is that no volatile products are evolved during curing and as a result amine cured epoxy resins have good dimensional stability.

Various amine hardeners, both aromatic, such as meta phenylene diamine and aliphatic such as ethylene diamine, diethylene triamine, and triethylene tetramine or chemical modifications thereof, such as with acrylonitrile, have been employed with epoxy resins with varying dgerees of success. Problems have arisen, however, in the use of these hardeners that have resulted either in operational difficulties or have somewhat limited the use or application of the final cured product. For example, in the casting of epoxy resin dies used in making automotive parts, thermal as well as dimensional stability are critical factors. The amine hardener employed for the curing of the resin must result in a product having a high heat distortion (temperatures above 125° C.). Aromatic polyamine hardeners, such as meta phenylene diamine have been advantageously employed as such, and products having a heat distortion temperature as high as 140° C. have been obtained. These aromatic compounds, however, have the disadvantage of being solids and are therefore difficult to incorporate in a viscous epoxy resin. As a result, these solid aromatic amine hardeners increase the viscosity of the overall resin composition and as a result bubble-free products are difficult to prepare. The aliphatic polyamine hardeners, such as ethylene diamine, although liquids do not yield products of high heat distortion temperature. Moreover, these aliphatic amine hardeners are so reactive at times that the time interval for a given amine hardened epoxy resin to reach its maximum useful viscosity is relatively short, and as a result these aliphatic amine hardeners are said to impart poor "pot life."

It has now been discovered that certain liquid alicyclic amines, particularly those related to 1,8 diamino paramenthane can be readily incorporated with viscous epoxy resins while at the same time decreasing the overall viscosity of the resulting resinous compositions. In addition, the amine-epoxide mixtures of the present invention have been found to have superior pot life, while at the same time, the cured resins have heat distortion temperatures as high as 140° C.

In accordance with the present invention, hardenable amine-epoxide compositions are provided, comprising a mixture of a compound containing terminal 1,2 epoxy groups and having an epoxy functionality of more than one, said compound being selected from glycidyl polyethers of polyhydric phenols and glycidyl aromatic amines, and of an alicyclic amine corresponding to the following formula:

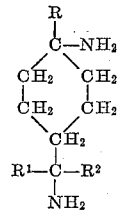

wherein R, R¹ and R² are each hydrogen or can be either separately hydrogen or a lower alkyl group, or are all lower alkyl groups, said lower alkyl groups containing up to eight carbon atoms, preferably methyl, ethyl or propyl.

The preferred complex glycidyl polyether compositions suitable for the practice of the present invention are usually prepared by condensing polyhydric substances, particularly the bisphenols such as diphenylolpropane with epichlorhydrin in the presence of a basic catalyst. If desired, however, other poly-functional substances, particularly aromatic amines may also be reacted with epichlorohydrin to form operable epoxy resins.

Polyhydric phenols suitable for condensing with epichlorhydrin to form the polyglycidyl ether compositions of this invention are the following: bis(4 hydroxy phenyl) methane, 4,4' dihydroxy biphenyl, 2,4' dihydroxy diphenyl methane, 2,2' dihydroxy diphenyl methane, 2,2' bis(4 hydroxyphenyl) propane and the like. Suitable also are the polyglycidyl ethers prepared from novolak phenol-formaldehyde condensation products containing from 60-65 weight percent diphenylol methane and 35-40 weight percent of tri- and tetra-phenylol derivatives.

The glycidyl polyethers of the dihydric or bisphenols are usually prepared by reacting one to two or more mols of epichlorohydrin with a mol of dihydric phenol at temperatures in the range of 50° C. to 100° C. in the presence of a base such as sodium or potassium hydroxide. Low molecular weight glycidyl polyethers may be obtained by employing large excesses of chlorhydrin, such as 5 to 10 mols with a mol of dihydric phenol. Higher molecular weight products may be obtained by decreasing the ratio of chlorohydrin to the dihydric phenol.

Suitable aromatic amines to be reacted with epichlorhydrin to form polyglycidyl derivatives useful in this invention are aniline, toluidine, xylidene, amino diphenyl, phenylene diamine, ortho tolidine, ortho dianisidine, 4,4' methylene dianiline, para amino phenol and the like.

The polyglycidyl amines are generally prepared by reacting the aromatic amine with from one to two times the stoichiometric amount of epichlorhydrin at a temperature of 80° to form the chlorohydrin amine which is then dehydrochlorinated with caustic with the formation of the glycidyl amines. The two stages of the reaction can be represented as follows:

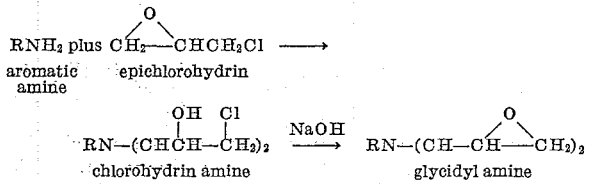

A linear glycidyl polyether of a dihydric phenol is represented by the formula:

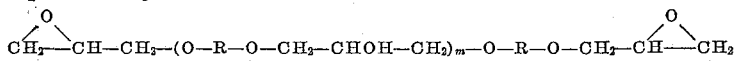

wherein R represents the divalent hydrocarbon radical of a dihydric phenol, and $m$ is an integer of a series 0, 1 and 2. In the limiting case where $m$ is 0, the glycidyl polyether will contain two epoxide groups,

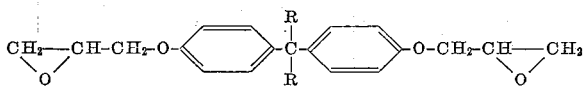

where R is hydrogen or alkyl.

The epoxy functionality is defined as the measured molecular weight of the glycidyl polyether divided by the epoxide equivalent weight. By definition, therefore, the epoxy equivalent weight of the diglycidyl ether containing two epoxy groups would have to be half the mol weight of the diglycidyl bisphenol and the epoxy functionality would be two. It should be appreciated, however, that in any given instance, the terminal epoxide groups may be in hydrated form. Moreover, as the obtained polyether is only a mixture of compounds, only the average molecular weight may be calculated at any one time. Accordingly, the epoxide functionality will be between one and two when diphenols are employed.

In the practice of one form of the invention, a glycidyl polyether of a bisphenol having an epoxide functionality greater than one can be converted to a resin by intermixing with an alicyclic diamine of the present invention in amounts varying from 0.7 to 1.3 equivalents of amine hydrogen per epoxide equivalent of the polyether. The cure is effected at room temperature to 200° C. with a preferred range of 60–160° C. Experience has shown that best results are achieved when the polyether and the alicyclic amine are employed in stoichiometric amounts with respect to hydrogen equivalents of the amine and epoxide equivalents of the polyether.

To compare the curing performance of an alicyclic polyamine with various conventional amine hardeners, there was first prepared a typical glycidyl polyether used by the trade.

PREPARATION OF GLYCIDYL POLYETHER OF 2,2-BIS(4-HYDROXYPHENYL)PROPANE

A solution of 228 grams (1 mol) of 2,2-bis(4-hydroxyphenyl) propane, 555 grams (6 mols) of epichlorohydrin and 150 grams ethanol (95 percent) was maintained at a temperature of 50° C.–65° C. While the solution was continuously stirred, 92 grams (2.3 mols) of sodium hydroxide, in the form of 50 percent by weight aqueous solution, were slowly added over a period of four hours. The reaction mixture was then transferred to a separatory funnel and the organic layer containing the polyglycidyl ether was separated off. The excess epichlorohydrin and alcohol were distilled, at reduced pressure (30 mm. Hg), from the organic layer to a residue temperature of 140° C. The residue product had an epoxy equivalent weight of 190–200 grams per gram mol. The viscosity of the residue product was about 12,000 to 17,000 cs. at 25° C.

In the following example there is shown the effect of lowering the viscosity of this glycidyl polyether by the addition of a curing amount of an alicyclic polyamine and in subsequent Tables I and II the chemical and physical properties of the cured composition of Example 1 in comparison with epoxy compositions cured with conventional hardeners.

Example I

A 96.5 gram charge of the aforedescribed glycidyl polyether of 2,2-bis(4-hydroxyphenyl)propane

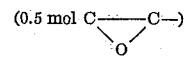

was mixed at 25° C. with 22.5 grams (0.5 mol NH) of 1,8-diamino paramenthane forming a clear, homogeneous solution. The resultant mixture had a viscosity of 1200 centistokes as compared to original viscosity of 12,000–17,000 centistokes of the glycidyl polyether. The mixture was de-aerated by subjecting it to subatmospheric pressure and then poured into metal molds having a mold cavity shape producing a cast bar 9 inches long, 6 inches wide, and ¼ and ⅛ inch thick. The mixture was cured by being heated for 16 hours at 85° C. and was then annealed by further heating at 160° C. for 3 hours.

The same glycidyl polyether was also cured in the same manner with different conventional amine hardeners, namely 4,4'-methylene dianiline and an aliphatic amine hardener, hereinafter identified below with resin compositions A and B respectively. The latter hardener was prepared by mixing together at 60–65° C. 105 parts by weight of acrylonitrile, 350 parts diethylene triamine and 265 parts of 1-hydroxy-ethyl-2-heptadecanyl imidazole, heating to 110° C. and then cooling to 25° C., the resultant reaction product having a viscosity of 35 centistokes at 25° C., sp. gr. 0.970 at 25° C. and contained 16.0 milliequivalents of amine per gram.

*Resin composition A.*—96.5 gm. of the same glycidyl polyether used in Example I were mixed with 25 g. 4,4' methylene dianiline (0.5 mol NH) and the mixture warmed to 80° C. to bring about solution. The mixture was de-aerated, cast into molds and cured as indicated in Example I.

*Resin composition B.*—107 gm.

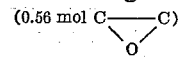

of the same glycidyl polyether used in Example I were mixed with 24.2 gm. (0.56 mole NH) of the aliphatic amine hardener described above at 25° C. The mixture was de-aerated, cast into mold and cured as previously described in Example I.

TABLE I

[(A.S.T.M. procedures)[1]—Mechanical properties of bisphenol resin compositions.]

| | Example I | A | B |
|---|---|---|---|
| Viscosity of composition, 25° C. | 1,200 cs | 12,000 cs | 1,100 cs. |
| Pot life at 25° C. | 24 hrs | 8 hrs | 60 min. |
| Gel time at 160° C. | 15 min | 6 min | 32 sec. |
| Heat distortion (D648-45T) | 142°–143° C | 140° C | 78° C. |
| Izod Impact (D256-47T) ft. lbs. | 0.32 | 0.25 | 0.25. |
| Rockwell hardness (D785-51) | M109–113 | M108 | M93. |
| Flexural strength, p.s.i. (D790-49T) | 15,000–17,500 | 20,000 | 18,700. |
| Flexural modulus, p.s.i. (D790-49T)×10⁻⁶ | 0.41 | 0.44 | 0.46. |

[1] American Society for Testing Materials.

An evaluation of the above experimental data will clearly reveal the more desirable properties of the amine resin composition of the present invention over those of the art. It is to be particularly noted that the resin composition of Example I, moreover, has a viscosity comparable to B, wherein the aliphatic amine hardener of the art is employed, and a heat distortion temperature higher than A, containing the conventional prior art aromatic amine hardener.

TABLE II

[Chemical resistance data [1] of bisphenol resins.]

| | Example | A | B |
|---|---|---|---|
| Distilled H²O | 0.37 | 0.49 | 0.45. |
| 10% NaOH | 0.31 | 0.42 | 0.39. |
| 30% H₂SO₄ | 1.03 | 0.54 | 1.31. |
| 95% Ethanol | 0.25 | 0.33 | 1.31. |
| Acetone | 2.41 | 2.45 | 5.2. |
| Ethyl Acetate | 0.02 | 0.36 | 0.32. |
| Ethylene Dichloride | 1.91 | 0.85 | 10.1. |
| Chloroform | Edges disintegrated. | 1.21 | Edges disintegrated. |
| Acetic Acid (glac.) | do | 0.13 | 7.1. |
| 10% NH₄OH | 0.40 | 0.51 | 0.44. |
| Toluene | 0.05 | 0.14 | 0.09. |

[1] Percent weight increase on 1″ x 3″ x ⅛″ piece after 7 days' immersion at 25° C.

Although the usefulness of 1,8 diamino-p-menthane, as a hardener for polyglycidyl ether resin systems, is clearly illustrated, by the experimental results in Table I and II above, these alicyclic amines may also be incorporated with other resin systems whereby additional valuable results are achieved.

DIAMINO-p-MENTHANE AS A HARDENER FOR VARIOUS EPOXY RESIN SYSTEMS

A glycidyl polyether residue was prepared from 555 grams (6 mols) of epichlorhydrin and 20.4 grams (1 mol) of an acid-catalyzed phenolformaldehyde novolak condensate containing 60–65% diphenylol methane and 35–40% of tri- and tetraphenylol derivatives, employing the same procedure employed in preparing the glycidyl polyether for Example I. The resulting residue product had an epoxy equivalent of 175–190 grams per gram mol and the viscosity of the product was about 10,000 cs. to 15,000 cs. at 25° C.

Example II

An admixture containing 176 grams of the residue product prepared above and 42.5 grams of 1,8 diamino-para-menthane was prepared at room temperature and cast into molds and cured as described in Example I.

A residue product of a tetra glycidyl derivative of 4,4-methylene dianiline, a conventional aromatic amine, was prepared as follows:

Materials:                              Amounts
    4,4′-methylene dianiline _____ 99.2 g. (0.5 m.).
    Epichlorohydrin _____ 780 g.
    95% alcohol _____ 195 g.
    Water _____ 25 g.

A solution of the amine in a mixture of the epichlorhydrin, alcohol and water was prepared at room temperature. The temperature of the solution was elevated and maintained at 80° C. for four hours. An analysis was then made, indicating that two mols of epichlorohydrin had been consumed. The temperature was lowered to 60° C. and 100 grams (2.5 mols) of 50 per cent aqueous sodium hydroxide was added to the solution over a period of 3⅓ hours. The mixture was stripped of any unreacted components such as epichlorohydrin and alcohol under reduced pressure and the residue was dissolved in toluene and washed with water. After the removal of the toluene under reduced pressure, the residue was obtained in 99% yield as an amber viscous product having an epoxy equivalent of 118 grams per gram mol. The viscosity was 40,000 cs. at 25° C.

Example III

The residue product (59 g.) of the 4,4′-methylenedianiline prepared above and 42.5 grams of 1,8-diamino-para-menthane was mixed, cast into molds and cured as previously described in Example I.

TABLE III

[1,8 diamino-p-menthane as a hardener for various epoxy systems (1 epoxy per active hydrogen)]

| Epoxy Resin Composition | Example 1 | Example 2 | Example 3 |
|---|---|---|---|
| Viscosity of Comp. at 25° C., cs | 1,200 | 1,600 | 2,900 |
| Pot life at 25° C., hrs | 24 | 24 | 24 |
| Gel at 150° C., hr | 1 | 1 | 1 |
| Mechanical properties: | | | |
|   Flexural Strength (lbs. per sq. inch) | 15,000–17,500 | 21,500 | 17,500 |
|   Modulus of Elasticity (p.s.i. × 10⁻⁶) | 0.41–0.45 | 0.50 | 0.56 |
|   Work to break (ft. lbs. ⅛″ x ½″ x 4″) | 1.38 | 3.84 | 1.44 |
|   Izod Impact (ft. lb./in. notch): | | | |
|     at 77° F | 0.32 | 0.28 | 0.22 |
|     at 0° F | 0.32 | 0.42 | |
|     at −20° F | 0.27 | 0.45 | |
|   Rockwell Hardness | M109–113 | M113 | M122 |
| ASTM Heat Dist. (°C.) | 142–143 | 138 | 189 |

For purposes of casting, potting and encapsulating, wherein amine-epoxide compositions are employed, the alicyclic amine hardeners of the present invention compare favorably and are in many ways superior to the aliphatic and aromatic amine hardeners of the prior art, as evidenced by the above experimental results. For example, unlike typical solid aromatic amine hardeners, the liquid diamino-p-menthane may easily be incorporated with a viscous epoxy resin and the resulting cured amine-epoxide compositions are bubble free. Marked superiority over aliphatic amine hardeners are clearly indicated by the experimental data, whereby diamino-para-menthane epoxy compositions have excellent "pot life" and the resulting cured resin products have high heat distortion. Moreover, a variety of valuable results are achieved when the hardeners of the present invention are incorporated with various epoxy resin systems.

What is claimed:

1. Hardenable composition comprising a mixture of a compound containing terminal 1,2-epoxy groups and having an epoxy functionality greater than one selected from the group consisting of glycidyl polyethers of polyhydric phenols and N-glycidyl aromatic amines and an alicyclic amine corresponding to the following formula:

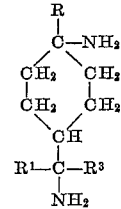

wherein R, R′ and R² are members selected from the group consisting of hydrogen and an alkyl containing up to 8 carbon atoms, said alicyclic amine being present in an amount sufficient to harden the composition.

2. Hardenable composition comprising a mixture of a glycidyl polyether of a polyhydric phenol containing terminal 1,2-epoxy groups and having an epoxy functionality greater than one and an alicyclic amine, as defined in claim 1.

3. Hardenable composition as defined in claim 2 wherein the polyhydric phenol is a dihydric phenol.

4. Hardenable composition comprising a mixture of a glycidyl polyether of a dihydric phenol containing terminal 1,2-epoxy groups and having an epoxy functionality greater than one and 1,8-diamino-para-menthane, said alicyclic amine being present in an amount sufficient to harden the composition.

5. Hardenable composition comprising a mixture of a N-glycidyl aromatic amine containing terminal 1,2-epoxy groups and having an epoxy functionality greater than one and an alicyclic amine, as defined in claim 1.

6. Hardenable composition as defined in claim 5, wherein the N-glycidyl aromatic amine is tetra N-glycidyl 4,4'-methylene-dianiline.

7. Hardenable composition comprising a mixture of a N-glycidyl derivative of 4,4'-methylene dianiline containing terminal 1,2-epoxy groups and having an epoxy functionality greater than one and 1,8-diamino-para-menthane, said alicyclic amine being present in an amount sufficient to harden the composition.

8. The process of producing a hardenable composition comprising intermixing an alicyclic amine corresponding to the following formula:

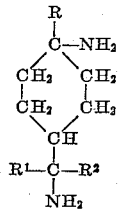

wherein R, R' and R² are members selected from the group consisting of hydrogen and an alkyl containing up to 8 carbon atoms, said alicyclic amine being present in an amount sufficient to harden the composition, with a glycidyl polyether of a polyhydric phenol, said glycidyl polyether having an epoxide functionality greater than one and having terminal 1,2-epoxy groups, in amounts varying from 0.7 to 1.3 equivalents of amine hydrogen per epoxide functionality of the glycidyl polyether, and curing the resulting mixture to a resinous product at temperatures in the range of 25° C. to 200° C.

9. Hardenable composition as defined in claim 2 wherein the polyhydric phenol is 2,2'-bis-(4-hydroxyphenyl)-propane.

References Cited in the file of this patent

UNITED STATES PATENTS

| | | |
|---|---|---|
| 2,632,022 | Bortnick | Mar. 17, 1953 |

FOREIGN PATENTS

| | | |
|---|---|---|
| 630,663 | Great Britain | Oct. 18, 1949 |

UNITED STATES PATENT OFFICE
Certificate of Correction

Patent No. 2,897,179   July 28, 1959

Leon Schechter et al.

It is hereby certified that error appears in the printed specification of the above numbered patent requiring correction and that the said Letters Patent should read as corrected below.

Column 1, line 60, for "dgeress" read —degrees—; column 5, Table II, first column, first item thereof, for "Distilled H²O" read —Distilled $H_2O$—; column 6, lines 54 to 57, lower portion of the formula, for

Signed and sealed this 9th day of February 1960.

[SEAL]

Attest:
KARL H. AXLINE,
Attesting Officer.

ROBERT C. WATSON,
Commissioner of Patents.